Patented May 26, 1936

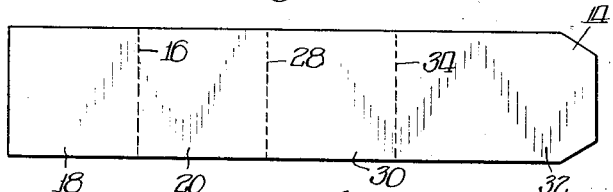

2,042,059

UNITED STATES PATENT OFFICE 2,042,059

MEANS FOR AND METHOD OF FILLING OR REFILLING COMPACTS OR THE LIKE

Holly W. Jeffries and Arthur B. Steward, Chicago, Ill.

Application May 16, 1932, Serial No. 611,523

28 Claims. (Cl. 132—82)

The present invention relates to novel means for and method of filling or refilling compacts or the like.

At the present time, most compacts are of one of two constructions, namely, to receive loose powder or to receive powder in cake form. It is recognized that powder in cake form is inferior to powder in the loose form inasmuch as, when powder is marketed in the form of a cake, it is necessary to incorporate certain materials having adhesive qualities for holding the minute particles together which are injurious to the skin. It is also necessary, in order to put this powder out in the form of cakes, to include powdery materials which are heavy, which materials are also detrimental to the skin. On the other hand, loose powder is far less objectionable for use than powder in cake form, but inasmuch as no suitable compact has been constructed which could be easily and readily refilled as desired without spilling a considerable portion of the powder being used as a refill, these loose powder compacts have not been used as extensively as they otherwise would be if this objectionable feature could be avoided.

It is therefore an object of the present invention to provide novel means adapted to hold sufficient powder to constitute a refill for a compact and which may be conveniently carried until it is desired to use the same.

Another object of the present invention is to provide novel means adapted to retain a given quantity of loose powder to be used as a refill for a compact or the like, which may be easily and readily placed in a position to discharge the contents thereof into the powder chamber of a compact without danger of spilling any part or portion of this powder.

The present invention contemplates the idea of providing a novel filling device for compacts or the like, which includes an envelope adapted to contain and retain a given quantity of loose powder sufficient to constitute a refill for the compact, and which is of proper size to be entirely closed in the powder chamber of this compact, suitable means being provided and being operable from the exterior of the compact for opening the envelope to deposit the powder contents into the compact.

Still another object of the present invention is to provide a novel filling device for compacts and the like, which includes an envelope having a destructible joint forming a compartment for retaining a suitable quantity of loose powder sufficient to constitute a refill for the compact, this envelope being formed with a portion adapted to extend outwardly from the powder chamber of the compact and between the same and a closure member therefrom into a position to be grasped for the application of force adapted to break the joint of the envelope, whereby the loose powder within the compartment of the envelope is adapted to be deposited in the powder chamber.

Still a further object of the present invention is to provide a novel filling device for compacts or the like, which includes an envelope adapted to contain a given quantity of loose powder sufficient to constitute a refill for the compact, and which is secured to a supporting member providing a temporary closure member for the powder chamber of the compact when the closure member for the compact is in its open position, suitable means being provided for opening the envelope to deposit the loose powder contained therein in the powder chamber of the compact. More particularly, the present invention comprehends the idea of forming this envelope with a destructible joint, as likewise a portion extending therefrom and outwardly beyond this temporary closure member which acts as a support for this envelope, which portion is adapted to be grasped for application of force to break this joint and deposit the loose powder within the chamber. This particular form of the present invention is particularly adapted for use in connection with compacts circular in form, or other than rectangular.

The present invention still further comprehends the idea of providing novel refills for compacts or the like as new articles of manufacture, and which may comprise an envelope or an envelope secured to a supporting member serving in the capacity of a temporary closure member for a compact, either of which of these articles of manufacture may be conveniently displayed until sold, and handled and carried by the purchaser until used without danger of spilling the contents thereof.

A still further object of the present invention is to provide a novel refilling device for compacts or the like, which comprises a rolled-up piece of material, between the convolutions of which is deposited sufficient powder to constitute a refill for a compact, such a rolled-up piece of material being adapted for use in connection with a member serving as a temporary closure member for a compact, as likewise to scrape the powder from this piece of material as the same is unwound.

Still another object of the present invention is to provide a novel filling device for compacts or the like, including an envelope filled with powder, this envelope being secured to a supporting member serving as a temporary member for the compact, and having a part extending through an opening thereof, suitable means being further provided on the supporting member adapted to engage this envelope for opening the same to deposit the contents thereof within the powder chamber of a compartment.

The present invention still further comprehends the idea of providing a novel method of refilling a compact or the like, which includes the steps of introducing or placing a sealed envelope wholly within the powder chamber of a compact or the like, and opening this container or envelope for the discharge of the contents thereof within the compact. More particularly, the present invention contemplates the idea of carrying out these steps in conjunction with a refilling device including a container adapted to be disposed within the powder chamber of a compact, and which is suitably secured to a supporting member serving as a temporary closure member for the compact.

Other objects, features, capabilities, advantages and method steps are comprehended by the invention, as will later appear and as are inherently possessed thereby.

Referring to the drawing:

Figure 1 is a plan view of a piece of material for forming a device in accordance with the present invention;

Figure 2 is a plan view of a piece of material shown in Figure 1 of the drawing with a portion thereof folded for forming a device made in accordance with the present invention;

Figure 3 is a view in perspective of a filling or refilling device made in accordance with the present invention, and partially completed;

Figure 4 is a view in perspective of a filling or refilling device made in accordance with the present invention, and in its completed form;

Figure 5 is a view in cross section of a compact, together with a filling or refilling device made in accordance with the present disclosure;

Figure 6 is a view in cross section of a compact, as likewise another modified form of filling or refilling device;

Figure 7 is a view in cross section similar to that of Figure 1 of the drawing, disclosing the filling or refilling device of Figure 6 partially opened in accordance with the present invention;

Figure 8 is a view in cross section similar to that shown in Figures 6 and 7 of the drawing, disclosing the filling or refilling device thereof in its completely opened position;

Figures 9 and 10 are views in cross section of a compact, together with an alternative construction for a filling or refilling device therefor;

Figure 11 is a view in cross section of a compact, together with a further alternative construction for a filling or refilling device therefor;

Figure 12 is a plan view of still another filling or refilling device made in accordance with the present invention;

Figure 13 is a view in perspective of the container or envelope used in conjunction with the device shown in Figure 12 of the drawing;

Figure 14 is a view in transverse cross section of the envelope shown in Figure 13 of the drawing; and Figure 15 is a fragmentary view in cross section disclosing a portion of the embodiment shown in Figure 12 more in detail.

Referring now more in detail to the drawing, and particularly to Figure 5 thereof, an embodiment selected to illustrate the invention is disclosed as comprising an envelope 2 containing powder or the like 4, this envelope 2 being adapted to be received wholly within a powder chamber 6 of a compact or the like 8 which is formed with a closure member 10 normally secured to the compact 8, as by means of hinges or the like 12. This envelope in the form as shown in Figure 5 of the drawing, is made from a piece of flexible material 14 which may be translucent, transparent or opaque, but preferably of cellophane, glassine or the like, so that the powder contained therein may be viewed from the outside. This piece of material is adapted to be stamped as desired for designating the quality and type of powder, as well as the origin thereof.

As shown in Figure 1 of the drawing, this piece of material 14 is elongated in form and may be folded, as for example, along the line 16 to form a flap 18 superimposed in relation to the adjacent portions 20 of this sheet of material thereunderneath. After this material or flap 18 has been folded, as shown in Figure 2 of the drawing, the edge portions 22 and 24 thereof, as well as corresponding portions of the part or portion 20, may be coated with some suitable adhesive material, which will secure these adjacent edges together to provide a pocket therebetween for receiving a quantity of powder or the like sufficient to constitute a refill for a compact. After this material has been inserted within this pocket, the edge portion 26 of this flap 18, as well as the oppositely disposed portion of the material 14 substantially defined by the line 28, are coated with some suitable adhesive material to provide an enclosed compartment for containing this quantity of powder. The present invention comprehends the idea of using some suitable adhesive which is of suitable consistency to adequately maintain these oppositely disposed folded portions of the piece of material together, yet of such a character as to permit the breaking of this joint formed thereby for releasing the powder, as will hereinafter be more fully disclosed.

After this powder has been completely enclosed within the compartment of this envelope, the portions 18 and 20 in folded condition are then folded onto the portion 30 and along the line 28 in a direction opposite to the fold of the portion 18 along the line 16 to provide an arrangement as clearly shown in Figure 3 of the drawing. This envelope, as shown in Figure 3 of the drawing, may be used in accordance with the present invention, in the form as shown therein, but in order that the same may be conveniently carried around, as, for example, within the purse or pocket of an individual who is to use this refill, as likewise to provide an envelope which may be conveniently secured to a display rack or the like, the end portion 32 of this strip of material 14 is brought around and about the line 34 into the position as shown in Figure 4 of the drawing, and the same is secured to the flap 18 as by means of a spot of adhesive or the like 36, this spot of adhesive preventing the reversing of the folds forming the compartment for the powder, which would result in spilling of the contents of the envelope.

As previously disclosed above in connection with Figure 5 of the drawing, the compact 8 is formed with a closure member 10 which may be moved into and out of its closed position, whereby access to the powder chamber may be gained for filling or refilling the same. In actual use, when it is desired to fill the compact 8 with powder, an envelope 2, which is made in accordance with the disclosures in Figures 1 to 4 inclusive, may be inserted wholly within the powder chamber 6 of this compact 8. The envelope 2 may be placed within the chamber 6 without breaking the connection between the tab 32 and flap 18 and into a position whereby the tab 32 extends outwardly between the compact and closure member 10, this adhesive 36 being broken upon the subsequent application of force. If desired, however, the end portion or tab 32 of the completed envelope 2 may be pulled to break its connection with the flap 18 of the envelope as by means of the spot of adhesive 36, previous to the introduction of the envelope 2 within the powder chamber 6. This envelope 2 is then inserted within the powder chamber 6, after the closure member 10 has been moved into its open position, and the tab or end portion 32 of the envelope may be disposed as shown and in contact with the upright wall of the compact. After this envelope 2 has been placed in this position, the closure member 10 may be lowered about its hinge means 12 into a partially closed position, as shown in this figure. Inasmuch as the material forming the envelope 2 is thin, it will be readily apparent that with some compacts where there is a sufficient opening between the closure member and body of the compact, or if there is sufficient play between these parts as where the material forming the compact is resilient, the closure member may be entirely closed, as by moving the same into its snapping engagement with the compact. When the refilling is effected as shown in Figure 5 of the drawing, the closure member 10 is held in the position as shown and the tab or end portion 32 may then be grasped between the fingers, and a force applied thereto sufficient to break the joint formed by the edge portions 22, 24 and 26 of the flap 18 with oppositely disposed portions of the part 20 of the piece of material 14. The breaking of this destructible joint causes the powder enclosed within the compartment of this envelope to be discharged within the powder chamber 6. Upon further application of force in an upward direction, the entire envelope may be broken along those joints referred to, and the entire strip of material 14 drawn outwardly and disposed of. The closure member 10 is substantially in its closed position, and with a slight application of pressure, the same may be moved into its closed position. It will be quite apparent that inasmuch as the closure member 10 is in substantial contact with adjacent portions of the compact 8, there is no danger of spilling any part or portion of the powder 4, and the entire amount is conveniently and easily deposited within the powder chamber 6.

In Figure 5 of the drawing, the envelope 2 of the type therein disclosed, is preferably used in connection with a compact which is rectangular in shape, and when so used, all portions of the strip of material 14 are in intimate contact with the upper edge thereof adjacent the closure member 10, whereby a uniform breaking of the joints referred to may be effected. The present invention also contemplates the idea of providing a filling or refilling device for compacts or the like, which are other than rectangular, although it is, of course, understood that the embodiments to be presently described may likewise be used in any type of compact.

Referring now more in particular to Figures 6 to 8 inclusive, a filling or refilling device, generally designated as 38, is shown in connection with a compact 40 which may, or may not, be of circular construction. In the embodiment shown in these figures, the filling or refilling device 38 includes an envelope 2 constructed in a similar manner as the envelope shown in Figure 3 of the drawings, but in this embodiment, instead of being finished in the manner as shown in Figure 4, the same is secured, as by means of the flap 18, to a supporting member 42 which is adapted to fit over the opening for the powder chamber 44 of the compact 40, and to serve as a temporary closure member therefor when the permanent closure member corresponding to the closure member 10 of Figure 5 of the drawing, is then in its open position. The tab or end portion 32 of the envelope 2 is inserted through a slit or opening 46 formed in the closure member 42, and is in a position to be grasped between the fingers of the person filling or refilling the compact 40, the closure member 42 when in position over the powder chamber 44 serving to maintain the envelope 2 wholly within the powder chamber and to provide a closure member for retaining the powder therein during the refilling operation.

As will be clearly apparent from Figures 6, 7, and 8, the joint forming the compartment of the envelope 2 for holding the powder 4 is broken by means of an upward application of force on the tab 32, the initial breaking of this joint depositing the powder 4 within the chamber 44, as clearly shown in Figure 7 of the drawing. Upon a further application of force to the tab 32, the entire joint may be broken until the entire portion of powder carried by the envelope 2 is finally deposited in the powder chamber of the compact 40. After the powder has been completely discharged from this envelope 2, as clearly shown in Figure 8 of the drawing, the closure member 42, as likewise the strip 14 forming the envelope 2 may be removed from the compact and disposed of, and the permanent closure member for the compact may then be snapped into its closed position.

In Figure 9 of the drawing, an alternative construction for a filling or refilling device is disclosed in connection with a compact 48, and this filling or refilling device includes a strip of material generally designated as 50, and which is rolled as shown to form a plurality of convolutions between which is disposed a quantity of powder 52 sufficient to constitute a fill or refill for the compact 48. The side edges of this strip of rolled material are not secured together and in order to prevent loss of powder 52 only the central portion of the strip is covered with a layer thereof, suitable wide margins being provided without powder to prevent loss thereof. This piece of material 50 is formed with a free end 54 adapted to extend upwardly beyond the compact 48 and be grasped for application of force thereto. When this filling or refilling device is employed, the same is preferably used in conjunction with a supplemental member 56 serving in the capacity of a temporary closure member for the compact 48, and the same is further formed with a downwardly depending portion 58 which is adapted to scrape the powder 52 from the strip of material 50 when the same is unrolled or unwound, as by means of application of force on the free end 54 in an upward direction. In this way the powder 52 is discharged into the powder chamber of the compact 48, and the member 56 is then removed, whereby the permanent closure member for the compact 48, corresponding to the closure member 10, may be moved into its closed position.

In Figure 10 of the drawing is disclosed still another filling or refilling device made in accordance with the present invention, and the same is shown in connection with a compact 60. In this embodiment, the envelope, generally designated as 62, is of somewhat different construction than the envelopes heretofore disclosed and is formed from an elongated sheet or strip of material having an end 64 secured to a supporting member 66 which serves as a temporary closure member for the compact 60 when the filling or refilling device is in the position as shown in this figure. This strip of material is folded as at 68, and refolded as at 70, which folded and refolded portions are overlapped as shown to provide an overlapped joint 72, which may be secured as by means of a suitable adhesive material to provide a compartment for a quantity of powder or the like 74, it being of course understood that the adjacent side edge portions of this strip are likewise suitably secured by this adhesive material to completely enclose this material 74. The free end 76 of this strip of material is inserted through a slit or opening 78 formed in the supporting member 66 to provide a suitable tab or extension which may be grasped between the fingers, whereby the lap joint 72 may be broken upon application of force in an upward direction. Upon a breaking of the lap joint 72, as well as the joint formed at the edges of this strip of material, the powder 74 is deposited within the powder chamber of the compact 60, and the strip of material, together with the supporting member 66, may be disposed of, and the permanent closure member for the compact moved into its closed position for retaining the powder.

In Figure 11 of the drawing is disclosed still a further modified form of filling or refilling device made in accordance with the present invention, and the same is disclosed in connection with a compact 80. In this embodiment, the filling or refilling device includes a supporting member 82 serving in the capacity of a temporary closure member for the compact 80, this member 82 being formed with slits or openings 84 and 86. The envelope, generally designated as 88, of this embodiment, is formed from a strip of material which is folded and refolded as at 90 and 92 to provide a butt joint 94 secured together as by means of any suitable adhesive material, the adjacent side edge portions of this strip being likewise secured together to provide a compartment for retaining a quantity of powder 96 or the like. The free ends of this strip of material are inserted through the slots 84 and 86 of the member 82 and are connected together, as at 98, to form a tab which may be grasped between the fingers. As will be quite apparent, upon an application of pressure on the tab 98 in an upward direction, the butt joint 94, as well as the joint adjacent the edges of this strip of material, is broken for depositing the powder 96 in the powder chamber of the compact 80.

In Figures 12, 13, and 14 is disclosed a still further embodiment made in accordance with the present invention, and the same comprises a supporting member or strip 100 having a slot 102 adjacent one edge thereof. An envelope suitable for this embodiment is shown in Figure 13 as being formed from a strip of material which is suitably folded to provide a central joint 104 to provide a compartment for a quantity of material 106. One end of this envelope is folded to form a flap 108 which may be secured to the supporting member 100 in any desired manner. The other open end 110 which is formed with a flap 112 is inserted through the slot 102 and projects above the upper surface of the supporting member 100, it being understood of course that this supporting member 100 acts in a similar manner as the supporting members previously described. In order to open this envelope of the present embodiment, suitable means 114 is provided in the form of a piece of wire or the like bent into the shape of a T, the end portions of which pass downwardly through the member 100 and are secured thereto as by means of the bent portion 116 to maintain the wire 114 in substantially rigid position relative to the member 100. The top bar portion 118 of the T-shaped member 114 is adapted to be received between the tab 112 and the material forming the central joint 104, while the leg portion 120 of this member is adapted to be oppositely disposed in relation to this central joint 104. When the tab 112 is grasped and moved in an upward direction, the envelope of this device is adapted to be opened along the seam or joint 104 as by means of the member 114 to deposit the powder or the like 106 within the compact.

From the above, it will be quite apparent that the present invention contemplates novel means for, as well as a method of, filling or refilling a compact or the like with loose powder without the possibility of spilling the powder. It is likewise apparent that a novel article of manufacture has been provided comprising a container or envelope which may or may not be provided with a supporting member, and which includes a sufficient quantity of powder for the purpose of filling or refilling a compact, this envelope being adapted to be easily and readily carried around until used, and being particularly adapted to be conveniently displayed for sale.

While we have herein described and upon the drawing shown illustrative embodiments of the invention, it is to be understood that the invention is not limited thereto but may comprehend other constructions, arrangements of parts, details, features and method steps without departing from the spirit of the invention.

We claim:

1. A refilling device for compacts or the like, comprising a piece of material folded upon itself to provide superimposed portions, and means for securing adjacent portions together to form a destructible joint and provide a compartment for holding material, said piece of material having a tab for breaking said joint to discharge said material from said compartment said tab being connected at one end thereof to said material adjacent to said joint.

2. In combination, a compact having a powder chamber, a refilling device for said compact comprising an envelope adapted to be received in said chamber and having adjacent portions thereof secured together to form a destructible joint and to provide a compartment, said compartment having powder or the like therein, and means extending from said joint beyond said chamber and adapted upon application of force to break said joint to discharge said powder from said envelope into said chamber.

3. In combination, a compact having a powder chamber normally closed by a closure member, a refilling device for said compact comprising an envelope adapted to be received in said chamber and having adjacent portions thereof secured together to form a destructible joint and to provide a compartment, said compartment having powder or the like therein, said envelope having a portion extending from said joint beyond said chamber and being received between said compact and closure member therefor when the latter is in its partially closed position whereby upon application of force thereto said joint is broken to discharge said powder into said chamber.

4. A refilling device for compacts or the like, comprising a supporting member, an envelope having a compartment filled with loose powder secured to said member, said envelope being formed with a destructible joint, and means extending from said joint beyond said supporting member for breaking said joint for opening said envelope to discharge said loose powder therefrom.

5. A refilling device for compacts or the like, comprising a supporting member, an envelope secured to said member on one side thereof, said envelope being formed with a destructible joint and having a compartment for holding powder or the like, said envelope having a portion extending beyond the other side of said member for breaking said joint to discharge material from said envelope upon application of force.

6. In combination, a compact having a powder chamber provided with an opening normally closed by a closure member, a refilling device for said compact comprising a supporting member adapted to fit over and close said opening when said closure member is in its open position, an envelope containing powder secured to said supporting member and adapted to be disposed in said chamber when said supporting member is placed over said opening, and means for opening said envelope for depositing said powder in said chamber.

7. In combination, a compact having a powder chamber provided with an opening normally closed by a closure member, a refilling device for said compact comprising a piece of rolled material having a plurality of convolutions, powder or the like disposed between said convolutions, a supplemental member adapted to close said opening when said closure member is in its open position and said rolled material is disposed in said chamber, said supplemental member having a portion spaced from said compact to receive a free end of said rolled material, said portion serving to scrape said powder from said material when said rolled piece is unwound by application of force to said free end.

8. In combination, a compact having a powder chamber provided with an opening normally closed by a closure member, a refilling device for said compact comprising a supporting member adapted to fit over said opening when said closure member is in its open position, an envelope containing powder or the like secured to said supporting member and being disposed within said chamber when said supporting member is placed over said opening, said supporting member having an opening adapted to receive a free end of said envelope, and means secured to said supporting member adjacent said opening and engageable with said envelope for opening the same to deposit the powder carried thereby in said chamber.

9. A method of filling a compact or the like having a chamber provided with an opening normally closed by a closure member, comprising the steps of moving said closure member into its open position, temporarily closing said opening with a member having an envelope secured thereto containing powder and adapted to be disposed in said chamber, opening said envelope to discharge said powder into said chamber, removing and disposing of said member and material forming said envelope secured thereto, and moving said closure member into its normally closed position for retaining said deposited powder in said chamber.

10. In combination, a material holder having a chamber, a filling device therefor comprising portions of material connected together to form a destructible joint and to provide a compartment therebetween for holding loose material, said device being adapted to be positioned relative to said holder whereby the said joint when destroyed forms a discharge opening for discharge of the material in said compartment to said holder, and means for breaking said joint to permit discharge of material from said device while maintaining substantially the same said relative position of said device with respect to said holder.

11. In combination, a material holder having an opening surrounded by a wall, a filling device comprising a member supported on said wall, means for holding a quantity of material, said means being formed in part by a piece of material for holding said material in association with said supporting member, and means for discharging said material into said holder without substantially moving said supporting member with respect to said wall.

12. In combination, a material holder having an opening surrounded by a wall, a filling device comprising a member supported on said wall, means for holding a quantity of material, said means being formed in part by a piece of material for holding said material in association with said supporting member and forming a destructible joint providing a discharge opening for passage of said material from said holding means into said holder when destroyed, and means for breaking said joint without substantially moving said supporting member with respect to said wall.

13. In combination, a material holder having an opening surrounded by a wall, a filling device comprising a member supported on said wall, means for holding a quantity of material, said means being formed in part by a piece of material for holding said material in association with said supporting member and forming a destructible joint providing a discharge opening for passage of said material from said holding means into said holder when destroyed, and means for moving said piece of material forming said joint to provide said opening and to discharge said material into said holder without substantially moving said supporting member with respect to said wall.

14. In combination, a material holder having an opening surrounded by a wall, a filling device comprising a member supported on said wall, means for holding a quantity of material, said means being formed in part by a piece of material for holding said material in association with said supporting member and forming a destructible joint providing a discharge opening for passage of said material from said holding means into said holder when destroyed, said piece of material having a tab adapted to be gripped to move said piece of material forming said joint to break said joint for discharging said material into said holder without substantially moving said supporting member with respect to said wall.

15. In combination, a material holder having an opening surrounded by a wall, a filling device comprising a member supported on said wall, means for holding a quantity of material, said means being formed in part by a piece of material for holding said material in association with said supporting member and forming a destructible joint providing a discharge opening for passage of said material from said holding means into said holder when destroyed, said piece of material having a tab extending above said supporting member and adapted to be gripped to break said joint for discharging said material into said holder without substantially moving said supporting member with respect to said wall.

16. A method of filling a compact or the like, comprising the steps of forming a container with a supporting part and material holding part having a quantity of powder disposed therein, placing said container in association with said compact so that said material holding part is disposed within the powder chamber thereof and the supporting part is supported thereon and forms a temporary closure for said chamber, and breaking said material holding part while in said chamber to deposit said powder therein.

17. A method of filling a compact or the like having a chamber provided with an opening normally closed by a closure member, comprising the steps of moving said closure member into its open position, placing an envelope containing powder within said chamber whereby a tab connected to a destructible joint of said envelope extends out of said chamber, temporarily and partially closing said closure member whereby said tab is disposed between the same and the wall of said chamber, pulling said tab to break said joint to deposit said powder in said chamber, removing the material forming said envelope, and moving said closure member into its normally closed position for retaining said deposited powder in said chamber.

18. A refilling device for compacts or the like, comprising a strip of material having an intermediate fold folded into opposite relation with an end portion of said strip to form a compartment for material, the other end of said strip forming said intermediate fold serving as a tab for opening said compartment.

19. A refilling device for compacts or the like, comprising a strip of material having an intermediate fold folded into opposite relation with an end portion of said strip, means for connecting the edge of said fold to said end to provide a destructible joint, the other end of said strip forming said fold normally extending over said first-named end and serving as a tab for breaking said joint.

20. A refilling device for compacts or the like, comprising a strip of material having an intermediate fold folded into opposite relation with an end portion of said strip, means for connecting the edge of said fold to said end to provide a destructible joint, the other end of said strip forming said fold extending over said first-named end, means for temporarily attaching said last-named end to said first-named end and serving as a tab for breaking said joint.

21. A refilling device for compacts or the like, comprising a support formed with a slot, a strip of material having an intermediate fold folded into opposite relation with an end of said strip and connected thereto to provide a destructible joint, said strip being connected to one side of said support, the other end of said strip forming said fold extending through said slot and adapted to be grasped on the other side of said support.

22. A refilling device for compacts or the like, comprising a support formed with a slot, a strip of material having an intermediate fold folded into opposite relation with an end of said strip and connected thereto to provide a destructible joint, said end being connected to one side of said support, the other end of said strip forming said fold extending through said slot and adapted to be grasped on the other side of said support.

23. A refilling device for compacts or the like, comprising a support formed with a slot, a strip of material having spaced folds folded into opposite relation to the intermediate portion of the strip to provide a compartment and connected together to form a destructible joint, means for connecting said strip to said support, the end of said strip forming one of said folds extending through said slot and being adapted to be grasped on the other side of said support.

24. A refilling device for compacts or the like, comprising a support, an envelope connected to one side of said support, and means extending from said envelope to the other side of said support for destroying said envelope adapted to hold loose powder to discharge the powder therefrom.

25. A refilling device for compacts or the like, comprising a support formed with a slot, a strip of material having spaced folds folded into opposite relation to the intermediate portion of the strip to provide a compartment and connected together to form a destructible joint, said strip being connected adjacent one of said folds to said support, the end of said strip forming the other of said folds extending through said slot and being adapted to be grasped on the other side of said support.

26. A refilling device for compacts or the like, comprising a support formed with spaced slots, a strip of material having spaced folds folded into opposite relation to the intermediate portion of the strip to provide a compartment and connected together to form a destructible joint, the ends of said strip forming said folds extending through said slots and being connected together on the other side to form a tab adapted to be grasped for destroying said joint.

27. In combination, a material holder having a chamber formed therein, a refilling device for said material holder and adapted to be placed in said chamber, said refilling device comprising a support, a container connected to one side of said support for holding a quantity of loose material, and means extending from said container to the other side of said support for discharging said material while said container is disposed within said chamber.

28. In combination, a compact having a powder chamber, a refilling device for said compact comprising a support, means connected to one side of said support for holding a quantity of loose powder, and means extending from said first-mentioned means to the other side of said support for discharging said powder.

HOLLY W. JEFFRIES.
ARTHUR B. STEWARD.